US006721890B1

United States Patent
Shrikhande

(10) Patent No.: US 6,721,890 B1
(45) Date of Patent: Apr. 13, 2004

(54) APPLICATION SPECIFIC DISTRIBUTED FIREWALL

(75) Inventor: Nikhil V. Shrikhande, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/304,749

(22) Filed: May 4, 1999

(51) Int. Cl.[7] .................................................. H04L 9/00
(52) U.S. Cl. ...................... 713/201; 713/200; 713/187; 713/152
(58) Field of Search ................... 713/200, 201, 713/152, 182; 709/217–225; 707/9–10

(56) References Cited

U.S. PATENT DOCUMENTS

| | | | | |
|---|---|---|---|---|
| 5,802,591 A | * | 9/1998 | Yachida | 711/164 |
| 5,919,258 A | * | 7/1999 | Kayashima et al. | 713/201 |
| 5,974,549 A | * | 10/1999 | Golan | 713/200 |
| 6,088,804 A | * | 7/2000 | Hill et al. | 713/201 |
| 6,480,959 B1 | * | 11/2002 | Granger et al. | 713/189 |
| 6,513,122 B1 | * | 1/2003 | Magdych et al. | 713/201 |

OTHER PUBLICATIONS

Maurice J. Bach, The Design of the Unix Operating System, 1986, Prentice–Hall Inc., pp. 22–23, 110.*
Amoroso et al. *PCWEEK: Intranet and Internet Firewall Strategies.* Emeryville, California: Ziff–Davis Press, 1996.

* cited by examiner

*Primary Examiner*—Ayaz Sheikh
*Assistant Examiner*—Chi-Chung Lee
(74) *Attorney, Agent, or Firm*—Leydig, Voit & Mayer, Ltd.

(57) ABSTRACT

An application specific distributed firewall provides a series of wrappers around network applications communicably linked to a registry server. Each wrapper is associated, within the registry server, with at least one group of wrappers, so that the wrapper of a compromised application may inform the registry server of an unauthorized access, which may then inform all group members. The wrappers of the noncompromised group applications may then restrict communication with the compromised application.

9 Claims, 4 Drawing Sheets

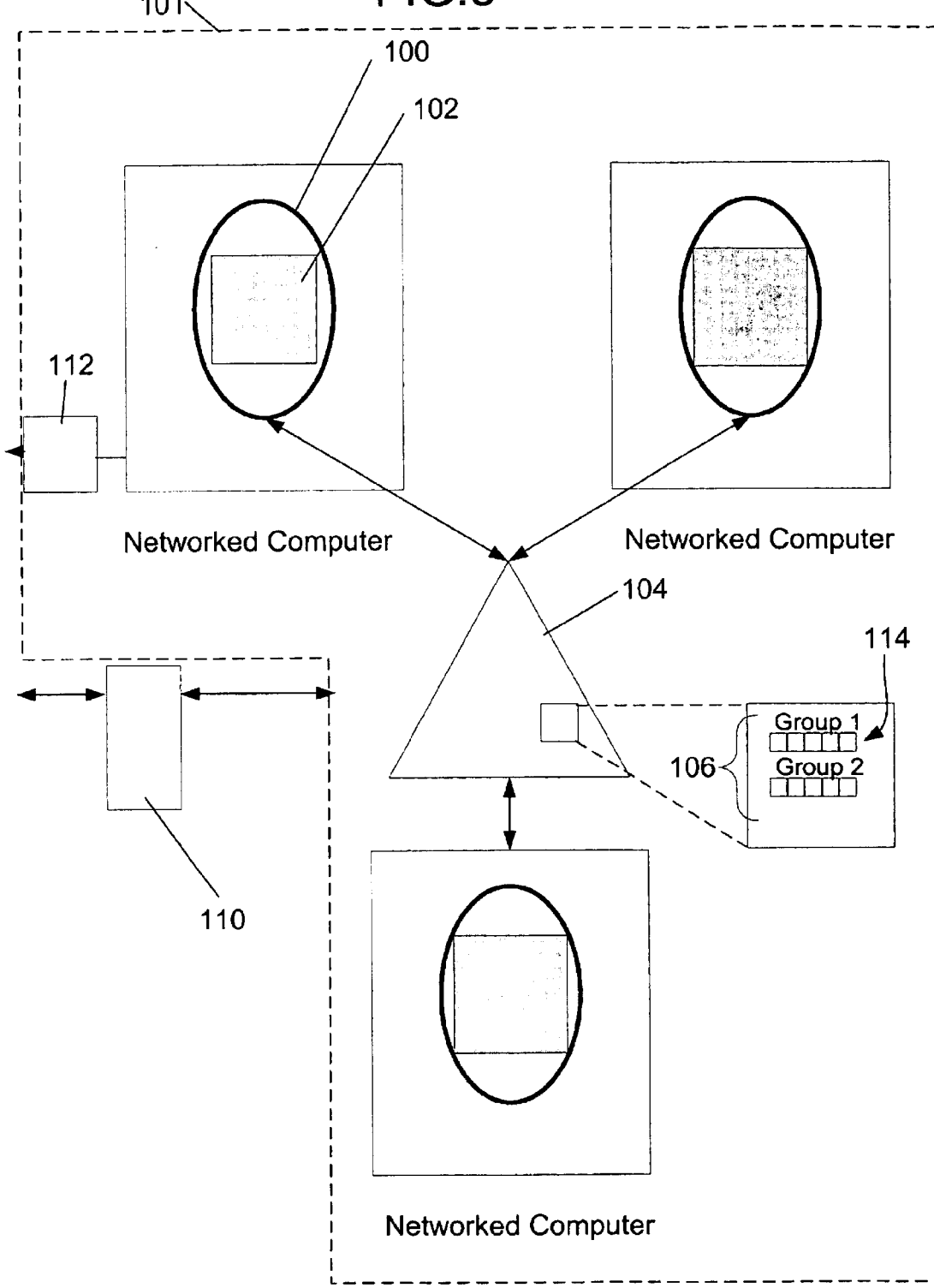

1

APPLICATION SPECIFIC DISTRIBUTED FIREWALL

TECHNICAL FIELD

This invention relates generally to network security and, more particularly, relates to the use of a distributed firewall to protect network applications and resources against unauthorized access.

BACKGROUND OF THE INVENTION

A firewall is traditionally utilized to control access to a computer network and to log any successful or attempted access to the network. Potentially threatening accesses will typically originate from the Internet, and thus the traditional firewall is installed at the point of connection between the computer network to be protected and the Internet. This method has been used to protect wide area networks (WANS) and local area networks (LAN's), and combinations of the two, as well as other types of networks. A local area network is a collection of computers and devices all connected to a common bus. Communications within a LAN are by a broadcast method, whereby all entities on the bus can receive the message, but only the addressed entity retains the information. Communications within a WAN are by a point-to-point method, whereby only the addressed recipient receives a particular communication. The LAN communication protocol is much faster, but is limited to relatively small distances whereas the WAN protocol is slower but may be used over great distances. Both LAN's and WAN's may be connected to the Internet.

Information transported by the Internet may be classified into subgroups called sessions, and sessions may be further divided into subgroups called packets. A packet is the most basic Internet transportation unit of information; a packet contains sufficient information to be routed to the correct destination service and to allow the destination service to reply to the source system. The source port number typically does not indicate the source application, while the destination port number may reveal valuable information about the destination service. This is because, by convention, standard network services usually have fixed port numbers. For example, the Telnet program typically is assigned port number 23. A session is a group of packets that have the same address information.

This distinction is important to some types of traditional firewalls, called session-aware firewalls. These firewalls are able to recognize that an incoming packet is part of an authorized session, such as perhaps a session originating from behind the firewall, and to act accordingly. Whether or not a firewall is aware of session information, in order to be effective it should at least be able to access and understand the address information contained in each packet. For example, one general class of firewall called a packet filter firewall simply uses filtering rules in conjunction with the packet address information to decide whether to pass or block a packet.

An application-level gateway is a type of firewall which utilizes session-awareness functionality. In contrast to packet filtering firewalls, an application-level gateway does not allow any packet to directly pass across the firewall. Rather, the application-level gateway requires that the connection be made through an application proxy running on the firewall itself. A major limitation of application-level gateways is that they require the installation at the firewall of a separate proxy application corresponding to each network service desiring to cross the firewall. While some application-level gateways avoid this problem by providing a generic proxy for unsupported applications, this technique decreases the security provided by such a firewall to approximately that provided by a bare packet filtering firewall, and allows much less speed than a bare packet filtering firewall. Further decreasing the efficacy of all traditional perimeter firewalls, including application-level gateways, is the fact that once penetrated, perimeter firewalls provide no more security to the network. Furthermore, traditional perimeter firewalls guard only a known gateway, and hence do not protect against access through an alternative gateway such as a modem connected to a machine within the network.

It is known to place a series of firewalls at the perimeter of a network to provide added intrusion resistance and to provide advance notice to an administrator of an intrusion before the last firewall is breached. This type of serially cascaded firewall, while potentially more effective than those mentioned above, does not solve the problem of intrusions through alternative gateways. Furthermore, these firewalls are generally also not easily customizable, and may serve to further decrease the transmission speed of the firewall. Still further, while a cascaded firewall may make a first successful unauthorized access to the network more difficult, once such access is achieved the entire network is rendered vulnerable.

From the foregoing, a firewall is needed which may be tailored to individual applications, which does not render the entire network vulnerable after one successful unauthorized access, and which substantially prevents circumvention through unknown gateways.

SUMMARY OF THE INVENTION

In accordance with this need, the present invention is generally realized in a method and system of network security using an application specific distributed firewall. In the utilization of the invention, a series of application wrappers are placed around individual applications throughout a protected network. Each wrapper is registered with a registry server in such a way as to be associated with a group of other application wrappers. In this manner, when any application is compromised, the wrapper associated with that application may notify the registry server which may in turn notify the wrappers belonging to the same group as the compromised application's wrapper. Subsequently, the notified group member wrappers may modify their local rules file to eliminate communication between their secured application and the compromised application, thus substantially preventing the entire network from being compromised after an unauthorized access to one application. Furthermore, because the firewall of the present invention is distributed, it generally prevents unauthorized access via known and unknown gateways alike.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a schematic diagram of a distributed firewall implemented in accordance with an exemplary embodiment of the invention.

DETAILED DESCRIPTION OF THE INVENTION

Figure 1:
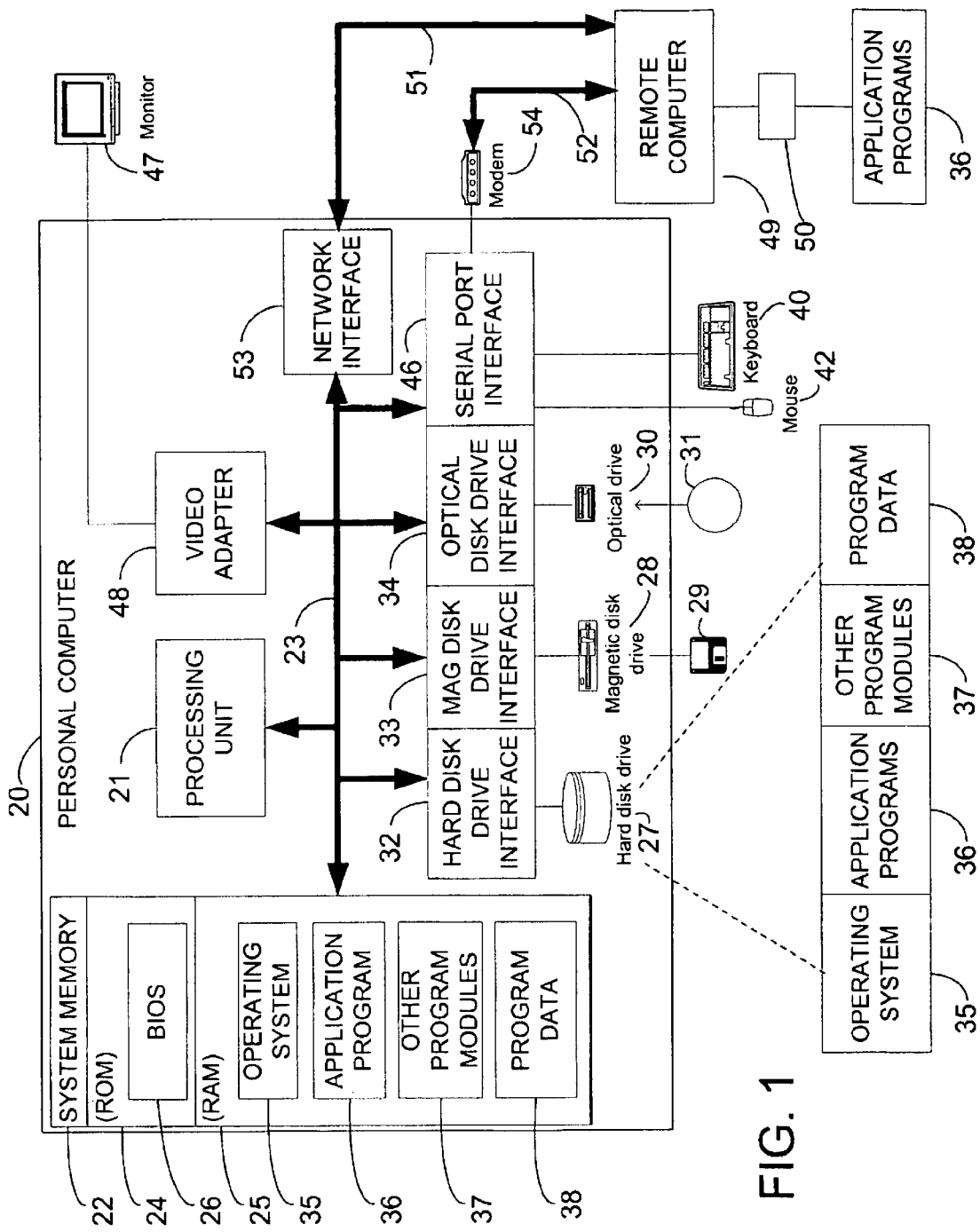
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. Steps or elements of the invention discussed as occurring or being located upon one computer may also be practiced in distributed computing environments where tasks are performed by remote processing devices that are linked through a communications network. In a distributed computing environment, program modules may be located in both local and remote memory storage devices.

With reference to FIG. 1, part of an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

A personal computer 20 used to implement the present invention will operate in a networked environment using logical connections to one or more remote machines, such as remote computer 49. The remote machine 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. Program modules depicted relative to the personal computer 20, or portions thereof, may be stored in the remote memory storage device. It will be appreciated that the network connections shown are exemplary and other means of establishing a communications link between the computers may be used.

Figure 2A:
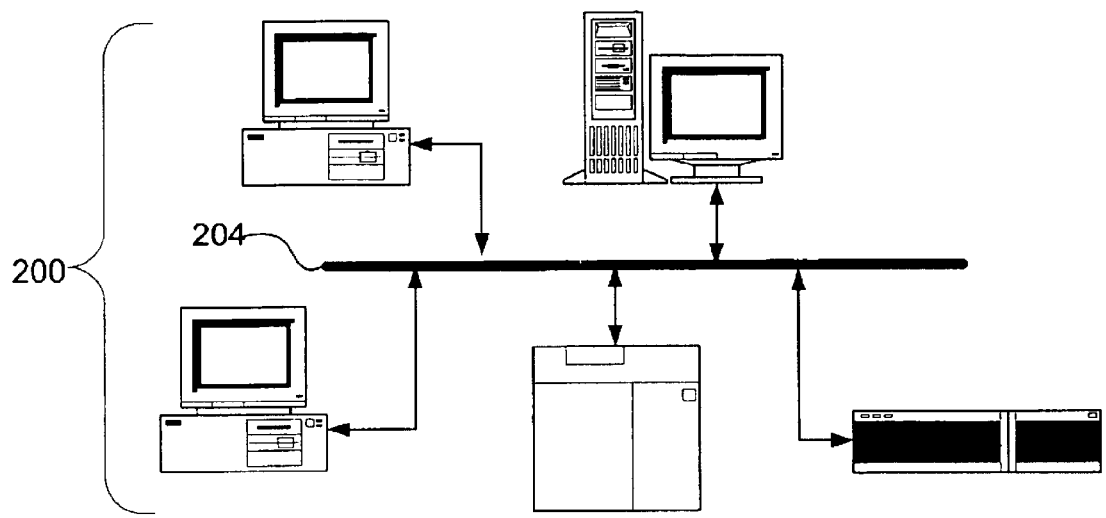
FIG. 2a is a schematic diagram of an exemplary LAN network within which the subject invention may reside.
Figure 2A:
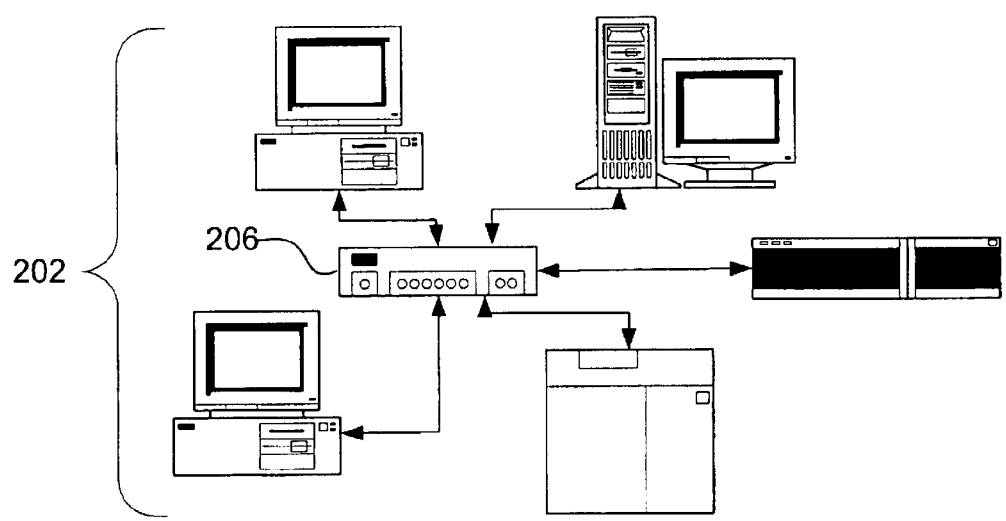
Figure 2B:
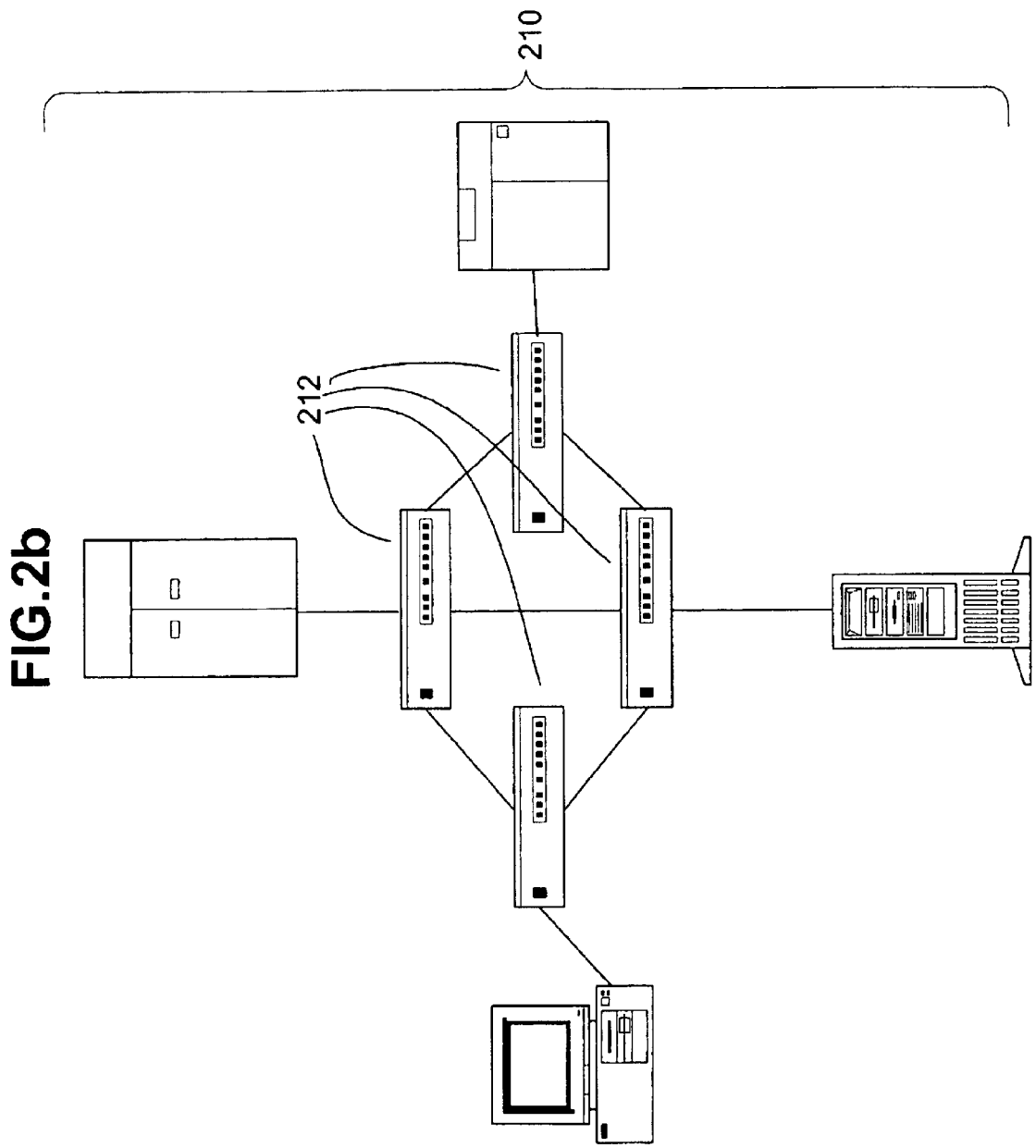
FIG. 2b is a schematic diagram of an exemplary WAN network within which the subject invention may reside.

FIGS. 2a and 2b more particularly illustrate the basic structure of LAN and is WAN networks respectively. The two networks illustrated in FIG. 2a are a Cable-based LAN 200 and a Hub-based LAN 202. In a Cable-based LAN 200, all network devices are connected to a common cable 204, while in a Hub-based LAN, all network devices are connected to a common hub 206. In either, any communication on any network line is communicated via the cable 204 or hub 206 to all network devices. Illustrated in FIG. 2b is a WAN 210. It can be seen that a communication from one network device to another within the WAN may be accomplished via the dedicated switches 212. The invention may also be implemented in an internetworking architecture in which LAN's and WAN's are utilized together.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In overview, the invention protects network applications by placing an application wrapper around each application, wherein each wrapper intercepts all communications to and from its application. Each wrapper is registered in a registry server as a member of a group of wrappers, the group preferably being made up of wrappers associated with applications that are expected to communicate with each other. When a particular wrapper detects an unauthorized access to its application, it notifies the registry server, which notifies all wrappers belonging to a group containing the particular wrapper. In this way, the other wrappers may subsequently restrict communication between their applications and the compromised application, effectively preventing unauthorized access to any part of the network beyond the compromised application.

Turning to FIG. 3, a diagram depicting in greater detail the informational flow within a network 101 protected in accordance with the invention is illustrated. The protection arises from the use of an application wrapper 100 in connection with each secured application 102. Each wrapper is communicably connectable to a registry server 104. The registry server 104 may be distributed and replicated to provide added fault tolerance. Within the registry server 104 are representations of groups of wrappers 106. The protected network 101 will typically be connected to the Internet via at least one gateway, or router 110, which may include traditional firewall functionality. Individual applications may also bypass the gateway 110 by connecting to the Internet by way of a modem or similar device 112.

The application wrapper 100 is preferably installable and removable only by an authorized entity such as a system administrator. Customization of the application wrapper 100 to the application 102 is achieved in that the installer may specify information regarding the protected application such as permissible users, cites, Internet Protocol addresses and so on. Also, the installer preferably selects a group 114 for the wrapper 100 to belong to once registered on the registry server 104. This group 114 preferably consists of the wrappers of the applications with which the protected application is expected to communicate. To register the wrapper 100 with the desired group 114, the wrapper 100, once installed, sends a message to the registry server 104, using an appropriate protocol such as "WINSOCK." The registry server 104 preferably responds by registering the wrapper with the appropriate group 114 and by sending a unique ID to the wrapper 100, usable in all future communications between the wrapper 100 and the registry server 104.

The wrapper 100 serves to intercept all communications directed to and from the secured application 102, and may in turn communicate with both the application and the outside world, including the registry server 104. The wrapper 100 preferably utilizes a local rules file stored on the host machine to analyze communications directed to and from the secured application 102, to determine when a potential unauthorized access has occurred or is occurring, and to control the communications accordingly.

One manner in which the wrapper 100 may detect an unauthorized access is to track and store the use patterns of an authorized user. In this manner, the wrapper 100 may detect a suspected unauthorized access, and may request additional authentication from the user before allowing further access. The wrapper 100 may use a simple packet filtering method to inspect communications, or may have session-awareness functionality. There are many other ways known to those skilled in the art in which the wrapper 100 may detect an unauthorized access.

When the wrapper 100 detects that an unauthorized access to the secured application 102 has occurred or is occurring, the wrapper 100 preferably sends a packet across the network to the registry server 104, containing the wrapper's unique ID and informing the registry server 104 of the suspected unauthorized access. In turn, the registry server 104 determines which group or groups the wrapper 100 has registered with. The registry server 104 then sends a packet to each wrapper that belongs to any group having as a member the wrapper 100, notifying them of the identity and compromised status of the application 102 associated with the wrapper 100. Preferably, upon receipt of such notification, each wrapper so notified modifies its local rules file in a manner so as to restrict or forbid communication with the compromised application 102. Thus, using the invention, an unauthorized access to one application will not render the remainder of the network vulnerable. Rather, the method of the invention will allow the remaining applications most likely to be accessed through the compromised application to be secured via their wrappers against further intrusion.

Because the registry server 104 preferably receives and retransmits all notifications of unauthorized access as discussed above, a system administrator or other entity responsible for managing network security may monitor the security state of network applications by observing the messages received by the registry server 104. It is further possible in an embodiment of the invention, that the registry server 104 actively notifies the entity responsible for network security when an intrusion is suspected to have occurred. Thus for example, the registry server 104 may, upon receipt of notification from a wrapper regarding a compromised application, place a phone call or page, or send an e-mail, or sound an audible alarm.

Because it operates on the level of the applications themselves, the firewall of the invention does not preclude the supplementary employment of a more conventional firewall such as one installed at the perimeter of the network 101. Also, the application level operation of the distributed firewall allows the firewall to guard substantially all routes into the network, not just known gateways. Thus for example, a wrapper may monitor modem traffic involving its secured application.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Thus, although the figures depict each application as having an associated wrapper, it is within the scope of the invention to place wrappers around only a subset of network applications. It will be further appreciated by one skilled in the art that the invention may be equivalently implemented in a network other than the exemplary networks shown. Accordingly, the invention is not limited to the illustrated embodiment, but may be, for example, implemented within a Virtual Private Network, a Metropolitan Area Network, or other type of network. Furthermore, connections between network elements may be transient or permanent, and may be physical connections, electromagnetic connections, or other means of transmitting information. Although the invention has been described in reference to network applications, it is understood that applications include any network service or resource capable of being damaged, misused, or misappropriated. Therefore, the invention as described herein contemplates all such embodiments as may come within the scope of the following claims and equivalents thereof.

I claim:

1. In a network comprised of a first computer having a first application capable of sending and receiving communications installed thereon and a second computer having a second application capable of sending and receiving communications installed thereon, each application having associated therewith security parameters for controlling communications with the application, a method of modifying the security parameters associated with the first application in response to an unauthorized access to the second application, the method comprising the steps of:

associating with the first application a first wrapper, and associating with the second application a second wrapper, wherein the first and second wrappers are adapted to intercept at least some communications directed to their associated applications and are further adapted to detect at least some unauthorized access to their associated applications; and if the second wrapper detects an unauthorized access to the second application, causing the second wrapper to notify the first wrapper of the unauthorized access; and causing the first wrapper to modify the security parameters associated with the first application in response to the receipt of notification.

2. The method according to claim 1, wherein the step of causing the first wrapper to modify the security parameters associated with the first application further comprises the step of:

causing the first wrapper to modify the security parameters associated with the first application so as to restrict communication with the second application while not restricting communication with applications that have not been the subject of unauthorized access.

3. The method according to claim 2, further comprising the step of registering the first and second wrappers with a registry server.

4. The method according to claim 3, wherein the step of causing the second wrapper to notify the first wrapper of the unauthorized access comprises the steps of:

causing the second wrapper to notify the registry server of the unauthorized access; and in response to the receipt of notification, causing the registry server to notify the first wrapper of the unauthorized access.

5. The method according to claim 4, wherein the network further comprises a third application having associated therewith a third wrapper, the method further comprising the step of:

causing the registry server to exclude the third wrapper from notification of the unauthorized access.

6. The method according to claim 3, wherein the network further comprises a third application having associated therewith a third wrapper, and the registry server contains a group of which the first and second wrappers are members, wherein the step of causing the second wrapper to notify the first wrapper of the unauthorized access further comprises the steps of:

causing the second wrapper to notify the registry server of the unauthorized access;

determining that the second wrapper is a member of the group;

determining that the first wrapper is also a member of the group;

in response to determining that the first wrapper is also a member of the group, causing the registry server to notify the first wrapper of the unauthorized access;

determining whether the third wrapper is a member of the group;

if the third wrapper is a member of the group, causing the registry server to notify the third wrapper of the unauthorized access; and if the third wrapper is not a member of the group, causing the registry server to exclude the third wrapper from notification of the unauthorized access.

7. In a computing environment comprised of a first application and a second application, each capable of sending and receiving communications a method for protecting the first application from unauthorized access, comprising the steps of;

associating with each application a wrapper, the wrapper being adapted to intercept at least some of the communications directed to the associated application;

registering the wrappers with a registry server;

associating the registered wrappers into at least one group;

detecting with the second wrapper that there has been an unauthorized access to the second application;

issuing a first notification of the unauthorized access from the second wrapper to the registry server;

determining that the second wrapper is a member of a group;

determining if the first wrapper is also a member of the group;

if the first wrapper is not a member of the group, excluding the first wrapper from notification of the unauthorized access; and if the first wrapper is a member of the group, issuing a second notification of the unauthorized access from the registry server to the first wrapper, thereby causing the first wrapper to restrict the communication of the first application with the second application while not restricting communication with applications that have not been the subject of unauthorized access, whereby the first application is protected from the unauthorized access to the second application.

8. For use in a computer network comprising a first computer and a second computer, and a first application on the first computer capable of sending and receiving communications and a second application on the second computer capable of sending and receiving communications, a computer readable medium for securing a network application, the computer readable medium comprising computer executable instructions for performing the steps of:

associating with the first application a first wrapper, the first wrapper being adapted to intercept at least some of the communications directed to the first application;

associating with the first wrapper on the first computer a file comprising security parameters for the first application;

receiving notification at the first wrapper that there has been an unauthorized access to the second application;

in response to the receipt of notification, modifying the security parameters for the first application so that the first wrapper restricts communication between the first application and the second application while not restricting communication with applications that have not been the subject of unauthorized access.

9. In a network comprising a first computer having thereon a first application capable of sending and receiving communications and a second computer having thereon a second application capable of sending and receiving communications, an apparatus for protecting the first application from unauthorized access, the apparatus comprising:

a first wrapper associated with the first application and a second wrapper associated with the second application and communicably connectable to the first wrapper, wherein the second wrapper is capable of detecting unauthorized access to the second application; and a local rules file associated with the first application, comprising security parameters for controlling communications involving the first application, whereby if the second wrapper detects unauthorized access to the second application, the second wrapper transmits a notification to the first wrapper, and the first wrapper modifies the security parameters in the local rules file to restrict communications between the first application and the second application while not restricting communication with applications that have not been the subject of unauthorized access.

\* \* \* \* \*